United States Patent
Hsu

(10) Patent No.: US 11,861,452 B1
(45) Date of Patent: Jan. 2, 2024

(54) QUANTIZED SOFTMAX LAYER FOR NEURAL NETWORKS

(71) Applicant: Cadence Design Systems, Inc., San Jose, CA (US)

(72) Inventor: Ming Kai Hsu, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1234 days.

(21) Appl. No.: 16/443,634

(22) Filed: Jun. 17, 2019

(51) Int. Cl.
| | |
|---|---|
| *G06N 3/063* | (2023.01) |
| *G10L 25/30* | (2013.01) |
| *G06F 17/18* | (2006.01) |
| *G06N 3/047* | (2023.01) |

(52) U.S. Cl.
CPC .............. *G06N 3/063* (2013.01); *G06F 17/18* (2013.01); *G06N 3/047* (2023.01); *G10L 25/30* (2013.01)

(58) Field of Classification Search
CPC ........ G06N 3/063; G06N 3/047; G06F 17/18; G10L 25/30
See application file for complete search history.

(56) References Cited

U.S. PATENT DOCUMENTS

| | | | | |
|---|---|---|---|---|
| 2008/0275847 | A1* | 11/2008 | Chellapilla | G06F 16/9014 |
| 2016/0283841 | A1* | 9/2016 | Sainath | G06N 3/045 |
| 2018/0032835 | A1* | 2/2018 | Shirahata | G06N 3/084 |
| 2018/0046894 | A1* | 2/2018 | Yao | G06N 3/04 |
| 2019/0114555 | A1* | 4/2019 | Akerib | G06N 7/01 |

OTHER PUBLICATIONS

Geng et al., "Hardware-Aware Softmax Approximation for Deep Neural Networks" in C. V. Jawahar et al. (Eds.): ACCV 2018 (Dec. 2-6, 2018), LNCS 11364, pp. 107-122, 2019. Retrieved from <https://link.springer.com/chapter/10.1007/978-3-030-20870-7_7> Published online May 25, 2019. (Year: 2018).*
Li et al., "Efficient FPGA Implementation of Softmax Function for DNN Applications," 2018 12th IEEE International Conference on Anti-counterfeiting, Security, and Identification (ASID), Xiamen, China, 2018, pp. 212-216 (Year: 2018).*
Du et al., "Efficient Softmax Hardware Architecture for Deep Neural Networks," GLSVLSI '19: Proceedings of the 2019 on Great Lakes Symposium on VLSI, May 9-11, 2019, pp. 75-80. (Year: 2019).*

* cited by examiner

*Primary Examiner* — Miranda M Huang
*Assistant Examiner* — Yao David Huang
(74) *Attorney, Agent, or Firm* — Schwegman Lundberg & Woessner, P.A.

(57) ABSTRACT

Quantized softmax layers in neural networks are described. Some embodiments involve receiving, at an input to a softmax layer of a neural network from an intermediate layer of the neural network, a non-normalized output comprising a plurality of intermediate network decision values. Then for each intermediate network decision value of the plurality of intermediate network decision values, the embodiment involves: calculating a difference between the intermediate network decision value and a maximum network decision value; requesting, from a lookup table, a corresponding lookup table value using the difference between the intermediate network decision value and the maximum network decision value; and selecting the corresponding lookup table value as a corresponding decision value. A normalized output is then generated comprising the corresponding lookup table value for said each intermediate network decision value of the plurality of intermediate network decision values.

20 Claims, 8 Drawing Sheets

QUANTIZED SOFTMAX LAYER FOR NEURAL NETWORKS

TECHNICAL FIELD

The present disclosure generally relates to the technical field of signal processing. In particular, the present disclosure addresses signal processing circuits, systems, instructions, and methods for quantized softmax layers for neural networks.

BACKGROUND

A popular signal processing application is deep learning. Most modern deep learning models are based on an artificial neural network that "learns" to perform tasks based on a set of training data. Floating-point data types are typically used to represent learning parameters in neural networks. As a result, deep learning applications often have large computational costs in terms of consumption of both memory and processing resources.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
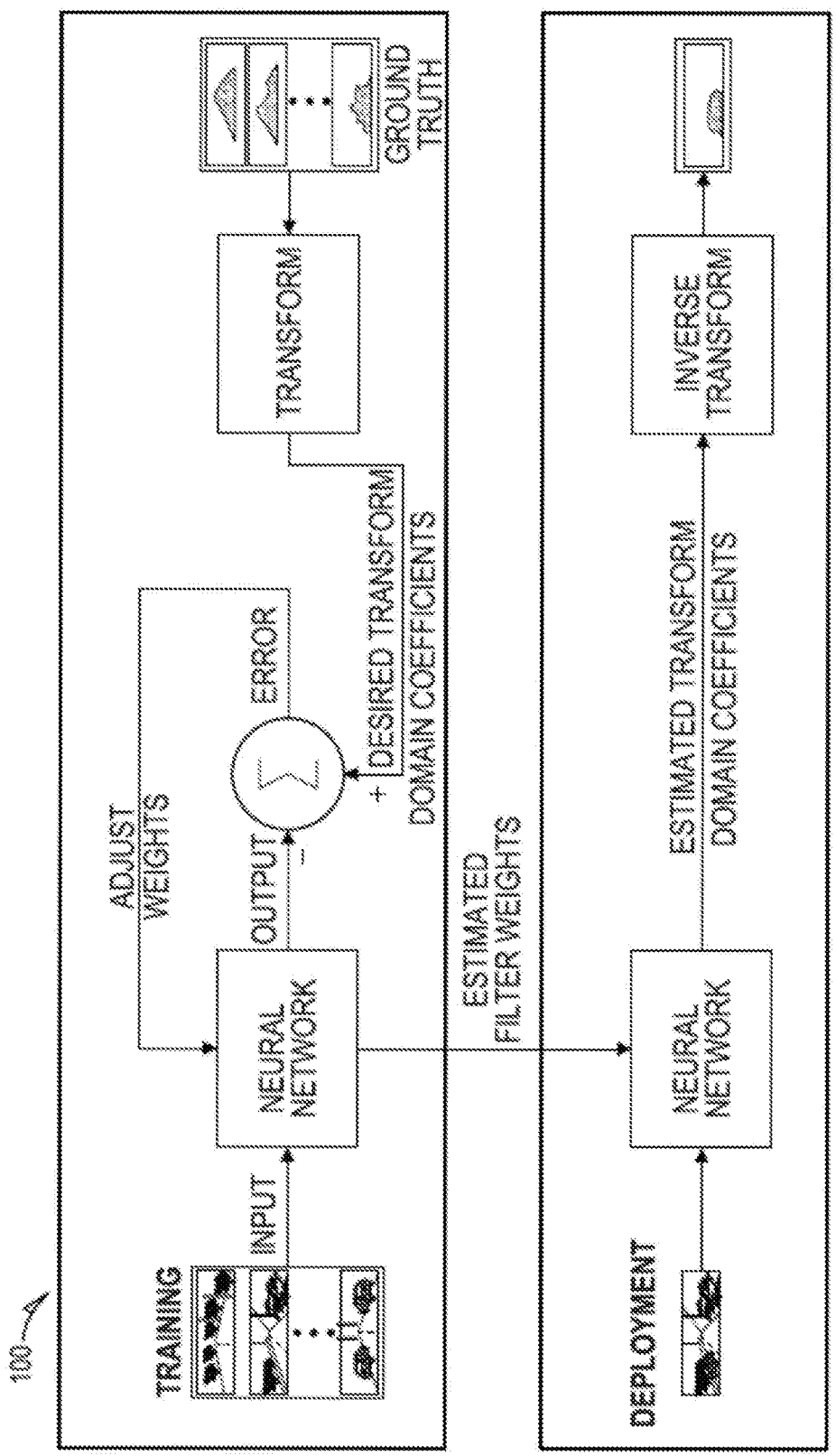
FIG. 1 is a diagram illustrating aspects of a neural network with a quantized softmax layer in accordance with some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Embodiments described herein generally relate to the technical field of signal processing, and in particular to processing circuits, systems, instructions, and methods for fixed-point quantized softmax layers for neural networks. In particular, embodiments describe the generation and use of a compact softmax lookup table structure generated with an index of the lookup table representing a distance between a current input and a maximum possible value of the softmax input. This enables improvements to a device by reducing memory resources for softmax operations and further reducing the associated processing resources for softmax operations when compared with similar operations using larger tables or deconstructed index entries.

Softmax, also known as a normalized exponential function, is a function that takes an input of vectors and normalizes the vectors into a probability distribution. In neural networks, softmax is used to map the non-normalized output of a network to a probability distribution for the output classes of the network.

Neural networks and associated softmax layers of such networks are being developed and deployed in a wide range of markets, with increasing resource and responsiveness requirements. As part of such trends, computational hardware for neural network-focused computations is being pushed to the end device (e.g., phones, cameras, vehicles, etc.) rather than concentrated at remote networked servers. This enables faster response times for network decisions, as well as specialized computational systems focused on the particular networks at the end device. While energy efficient circuits are able to deliver trillions of multiply accumulations (TMACs) for the computational layers of neural networks, the mathematical processes for computing softmax values remains excessively, resource-intensive for the general processing resources at such end devices. Instead of calculating softmax values, lookup tables have traditionally been used for such softmax values. The simplest lookup table structure, however, requires a separate lookup table for each input size, as described in more detail below. As input sizes increase, such tables can require many gigabytes of information, which again outstrips the available resources of many end devices. Previous attempts to simplify such tables have included decomposing inputs of exponential functions to multiple inputs with corresponding exponential functions in lookup table generation. This results in two large lookup tables with added computational costs. Even so, such systems result in both memory use and additional computation costs, which are significant for end devices.

Embodiments described herein improve the operation of end devices with neural network functionality by decreasing the resources used in softmax layers. This is done using a quantized lookup table, which degrades the accuracy of softmax values while greatly reducing needed resources. In some embodiments, the accuracy of output softmax values is degraded by between 0.1 percent and 0.01 percent, while reducing memory resource usage from multiple gigabytes to less than one hundred thousand kilobytes. In various embodiments, the particular resources used will depend on the particular design of the neural network. In addition to reducing the memory resources used, computation resource use is also reduce by reducing the processing resources to fetch values from multiple large tables in memory.

Some embodiments described herein generate such improvements via the use of a single lookup table. Instead of separate lookup tables representing the input value with a lookup table index based on the number of bits, embodiments described herein use a lookup table index based on a distance between a current input and a maximum possible value of the input. This enables a single softmax lookup table. Because this single lookup table is not decomposed, no additional computation costs are incurred.

Additionally, in contrast to computationally expensive floating-point data types typically used in neural networks that provide a way to represent a wide range of numbers precisely, fixed-point data types are limited in the range of values that can be represented, but can provide options for relatively low computational costs compared to floating-point data types. For a softmax layer with a significant number of inputs and outputs, many of the table entries are zero. Embodiments described herein can further reduce the size of the single lookup table by removing all duplicate entries with a zero value. For a sixteen bit input, embodiments described herein can use a table with a maximum size of 64 kilobytes (kb), but elimination of redundant zeros can reduce the size of such a table to approximately 20-30 kb. Other embodiments can use different input sizes, and the elimination of redundant zeros can result in different table sizes in different embodiments.

Aspects of some embodiments thus involve fixed-point quantization of floating-point neural networks (e.g., neural networks represented using floating-point data types), although embodiments are not limited to such implementations. For example, consistent with some embodiments, non-normalized output data from neural network comprising floating-point representations of probabilities associated with network analysis are accessed and quantized into fixed point data. This fixed point data can be mapped to normalized probability data using a table to estimate softmax values for the non-normalized output data. Errors associated with such quantization can be configured to be less than 1% (less than 0.1 or 0.01 percent in various embodiments), while providing significant reductions in processing resources used by a softmax layer. Various embodiments for generating a table that can be used for such fixed point softmax operations, as well as embodiments for using such a table, are described in detail below.

FIG. 1 is a diagram illustrating aspects of a neural network with a quantized softmax layer in accordance with some embodiments. With reference to FIG. 1, a high-level image segmentation process 100 is illustrated, according to some example embodiments. As shown, the process 100 is divided into two phases: training and deployment. In both phases, a softmax layer in accordance with embodiments described herein can be used to normalize the output of a neural network. FIG. 1 particularly illustrates an embodiment directed to image segmentation, but other embodiments, such as embodiments directed to data classification, or segmentation of other types of data other than image data, or any other such application of a neural network with a normalized output, can be used.

The training phases may be performed once per database and are typically very computationally intensive server-based operations. The deployment phase uses filter weights from the training phase, and is used by an application which can be operating on a server or on a client device, such as a phone. Embodiments described herein provide particular benefits to a resource constrained device such as a phone. In the training phase, a labeled data set (e.g., a set of images labeled according to class) are provided as input to multi-layered function (e.g., an FCN) as training data. The multi-layered function iteratively derives a set of filter weights from the labeled data set (e.g., through stochastic descent error minimization) for subsequent use in the deployment phase in estimating pixel labels in input images. Once the filter weights for the application are selected, a lookup table for the softmax layer of the deployment phase can be generated using operations described below. In the deployment phase, a neural network analyzes input data using the estimated filter weights, and then normalizes the output data using the quantized softmax layer with the lookup table. In other embodiments, various different combinations of training and deployment can be used for generating the lookup table and then the lookup table can be used for quantized softmax determinations as described below.

Figure 2:
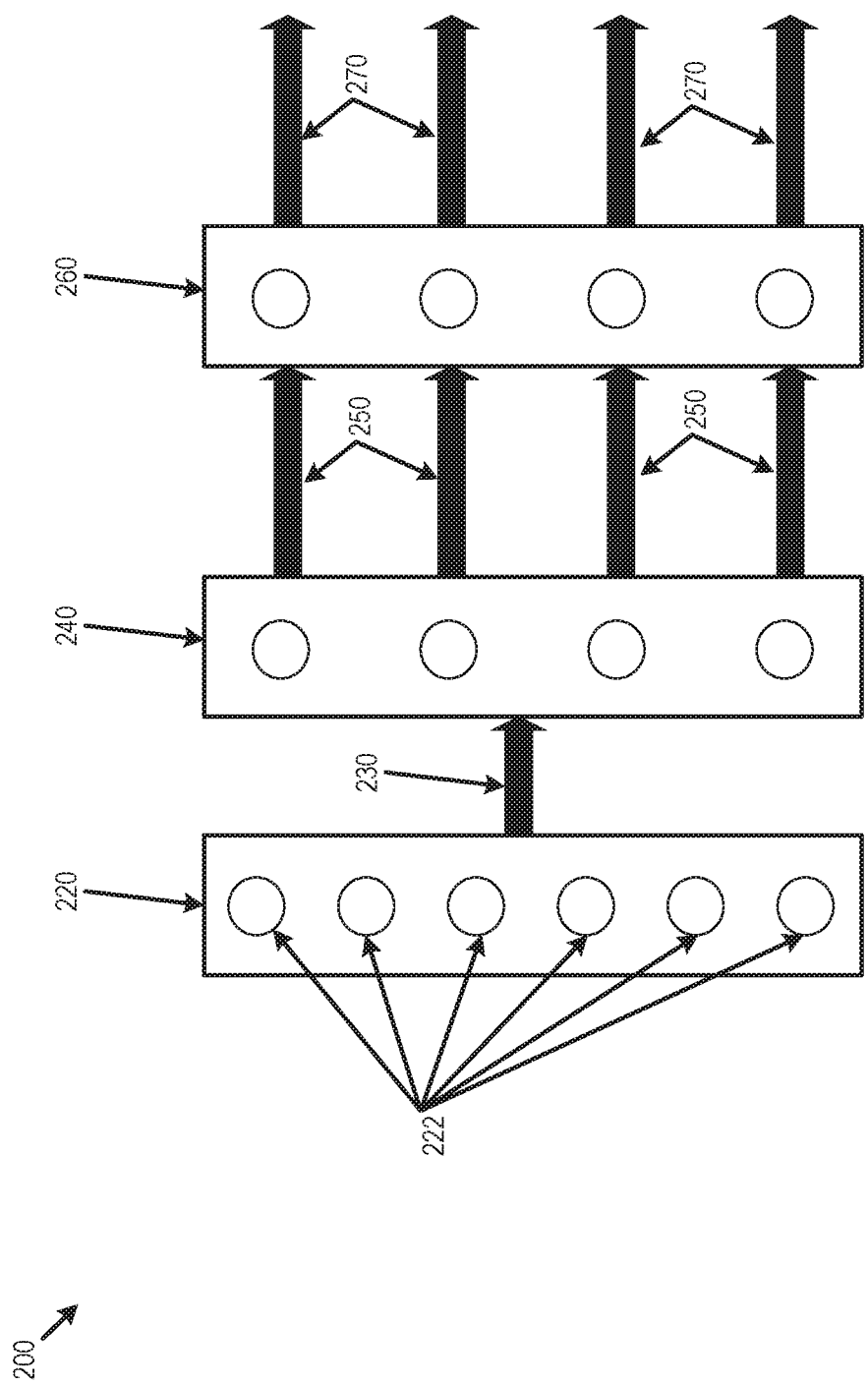
FIG. 2 is a diagram illustrating aspects of a neural network with a quantized softmax layer in accordance with some embodiments.

FIG. 2 is a diagram illustrating aspects of a neural network 200 with a quantized softmax layer 260 in accordance with some embodiments. FIG. 2 shows layers of a neural network 200, including intermediate layers 220, 240, and softmax layer 260. Intermediate layer 220 includes a plurality of neurons 222, which receive data from previous layers (not shown) in a neural network deployment. Weights for the neurons are set so that an input to an initial layer is processed using multiple layers. For a floating point neural network, a non-normalized floating point output 230 made up of a set of floating point values is communicated to layer 240. Layer 240 is a quantization layer that determines a quantization level for quantizing of the set of floating point values into fixed point values. For example, in 8-bit quantization, the fixed-point output 250 is an 8-bit number. Thus, with 8-bit quantization, the quantization level is 256, given that with 8 bits there are 256 possible bit patterns. Softmax layer 260 receives the non-normalized fixed point output 250, and uses this data to generate a normalized fixed point output as described in more detail below.

Figure 3:
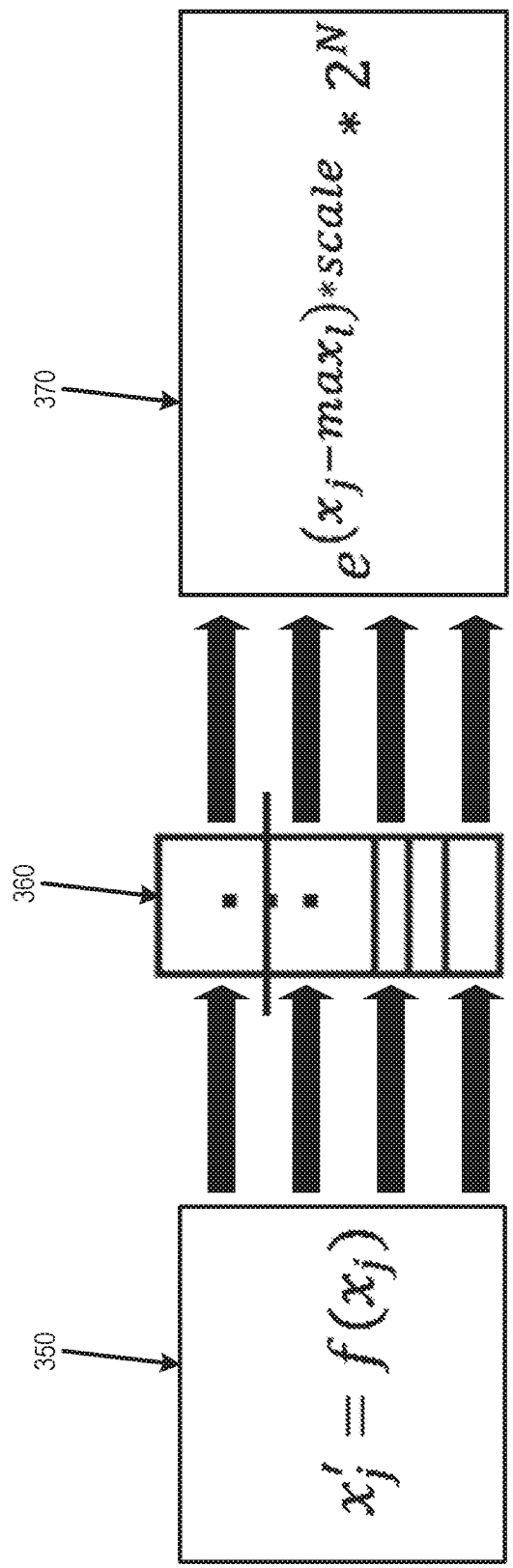
FIG. 3 is a diagram illustrating aspects of a neural network with a quantized softmax layer in accordance with some embodiments.

FIG. 3 is a diagram illustrating aspects of a neural network with a quantized softmax layer 360 in accordance with some embodiments. As mentioned above, softmax is a generalization of logistic regression, which involves computations of exponential functions.

$$softmax = \frac{e^{x_j}}{\sum_{i=0}^{k-1} e^{x_i}} \qquad (1)$$

where x is the input, k is the number of input components, i and j are input values greater than or equal to zero and less than k. Rather than consuming processing resources to calculate such functions, the results of such functions can be stored in lookup tables to reduce real-time computation costs at the expense of memory resources. In conventional softmax implementations, multiple lookup tables are used, with the number of lookup tables identical to the range of input (e.g., k tables), and the entries for example table k given by:

$$e^{(x_j - d - \max_m - 1) * scale} * (2^N - 1) \qquad (2)$$

where in is the number of calibration inputs (e.g. calibration images), wax is the maximum value of the softmax inputs (e.g. the maximum value output by the intermediate layers or the preceding layer to the softmax layer for in calibration images), N is the number of bits in the input values, d is an offset value, x+d used as an index of the lookup table, and scale is a scaling factor.

For floating point systems with a signed sixteen-bit data type, 65536 lookup tables are needed for complete solution detail, with a relatively large size for each table so that the total amount of memory used for lookup tables can be greater than eight gigabytes (Gb). Even for a smaller, eight-bit data type, the size of a single lookup table can be 512 bytes with 16 bytes for each entry and a memory usage for 256 lookup tables of 128 kilobytes (kb), but such an input significantly limits neural network applications. For example, for a network configured for 1000 classification classes, a sixteen bit input is recommended.

Instead of the above conventional system, embodiments described herein use a single small lookup table for quantized softmax. In the lookup table according to various embodiments, the index of the lookup table represents the distance between the current input and the maximum possible value of the input. This allows merging of multiple lookup tables into a single lookup table. Further, the size of the single lookup table can be reduced by removing duplicate entries with a content of zero. This reduces the size of the single table significantly in certain deployments. To achieve this, in some embodiments a number of lookup table entries is used to index lookup table computations, and this allows one fewer bit than the number of input bits to be used for lookup entry. The index for such a table can be considered:

$$\text{index} = x_j + \text{size}(LUT) - \text{max} - 1 \quad (3)$$

where size (LUT) is the number of entries after the elimination of redundant zeros.

Using such a table, the maximum possible table size for a sixteen-bit input is approximately 64 kb, with many applications having tables in the 20 kb to 30 kb range due to the elimination of redundant zero entries. Such table sizes will vary based on the application, but such lookup tables are able to fit in local data memory for many mobile platforms or devices or in tightly coupled memory of neural networking-focused digital signal processors (DSPs). Since the single table is not decomposed, there is no extra computation costs associated with decomposition.

As illustrated by FIG. 3 then, the non-normalized inputs 350 as quantized are mapped to the inputs of softmax layer 360. This mapping uses the index as a distance from the input value to the maximum possible value, thus merging all zero (e.g., entries with the same distance to the maximum) to the same table entry. The values from the lookup table of softmax layer 360 are accessed, and the normalized output values 370 are provided. As described, the entries for each element of the lookup table, and the associated normalized output values, are given by:

$$e^{(x_j - \text{max} j) * \text{scale}} * 2^N \quad (4)$$

Figure 4:
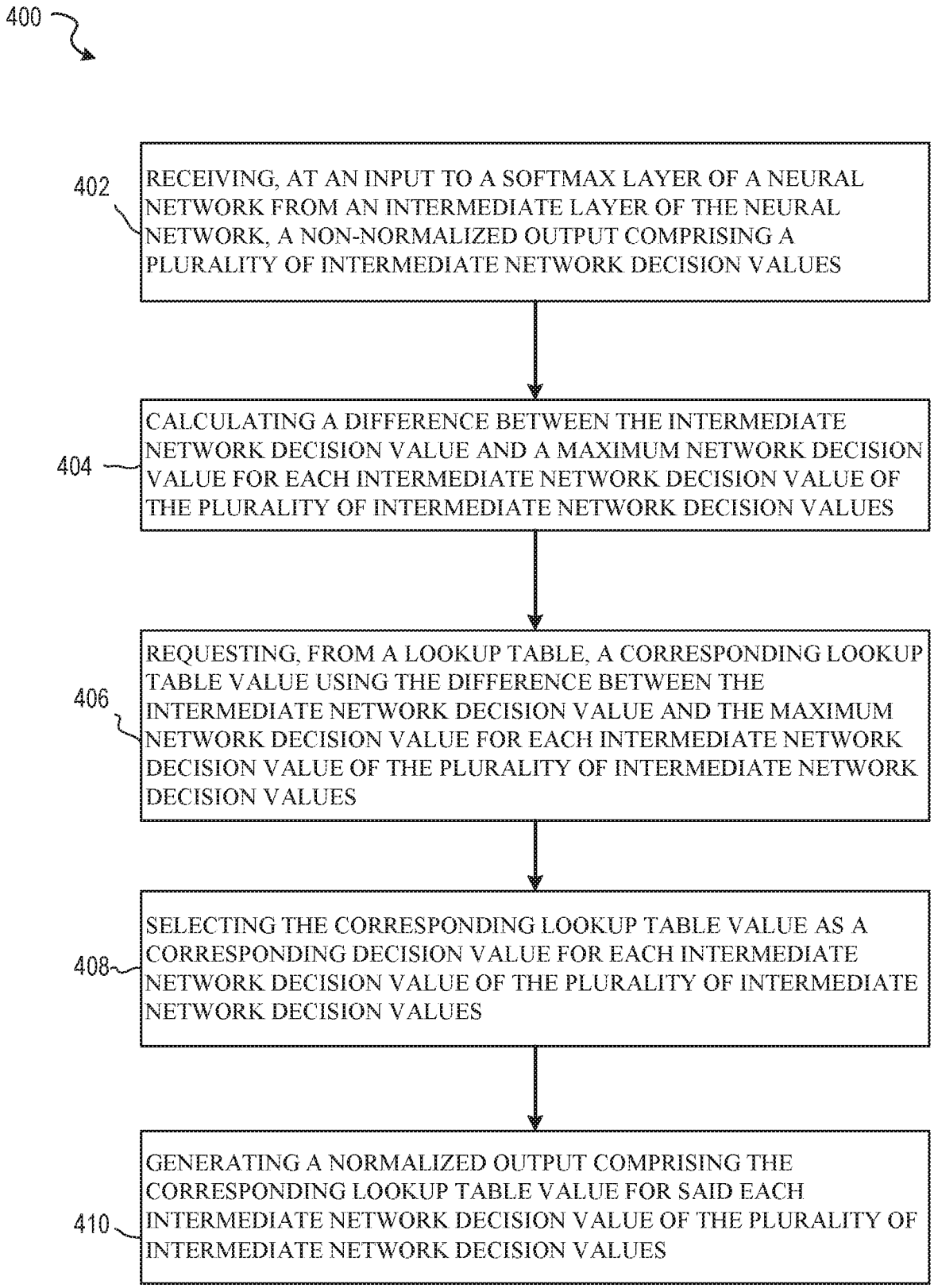
FIG. 4 is a flow chart illustrating a method of using a quantized softmax layer in accordance with some embodiments.

FIG. 4 is then a flow chart illustrating a method 400 of using a quantized softmax layer in accordance with some embodiments. In some embodiments, method 400 is implemented using circuitry of one or more integrated circuits specialized for neural networks. In some embodiments, method 400 is implemented as instructions in a storage memory that, when executed by processing circuitry of a device, cause the device to perform method 400.

Method 400 begins with operation 402 receiving, at an input to a softmax layer of a neural network from an intermediate layer of the neural network, a non-normalized output comprising a plurality of intermediate network decision values. Operation 404 involves calculating a difference between the intermediate network decision value and a maximum network decision value for each intermediate network decision value of the plurality of intermediate network decision values.

A corresponding lookup table value is then requested from a lookup table in operation 406 using the difference between the intermediate network decision value and the maximum network decision value for each intermediate network decision value of the plurality of intermediate network decision values.

The corresponding lookup table value is then selected as a corresponding decision value for each intermediate network decision value of the plurality of intermediate network decision values in operation 408, and finally, operation 410 involves generating a normalized output comprising the corresponding lookup table value for said each intermediate network decision value of the plurality of intermediate network decision values.

Such a method enables the improvements described above with a single small lookup table for quantized softmax operations. For example, in some embodiments, the plurality of intermediate network decision values comprise a plurality of signed sixteen-bit values, and may operate where the lookup table comprises less than the maximum number of entry values due to duplicate entries at the same distance to the maximum (e.g., less than 63000, 30000, or even 20000 entry values in some embodiments with sixteen-bit data types). The normalized output, which is then used for further evaluation in the application, can involve a plurality of unsigned sixteen bit values for a sixteen-bit input, and the corresponding lookup table value for said each intermediate network decision value comprises an unsigned fifteen-bit value. In other embodiments, matching bits values for inputs and outputs to the softmax layer are used (e.g., eight bits, 24 bits, etc.). In other embodiments, with significant reduction in the number of table entry values, the number of output bits can be smaller than the number of input bits. In some embodiments, this output value type for the lookup table is dynamically selected based on a number of entry values of the lookup table having a non-zero value during a training phase.

In some embodiments, the non-normalized input values are generated by converting a plurality of floating point intermediate network decision values from a non-normalized floating point output of a final add-accumulate layer of the neural network, the non-normalized output comprising the plurality of intermediate network decision values, wherein the plurality of intermediate network decision values comprise fixed point values.

Method 400 can be used in a wide variety of deployments of neural networks, such as image classification, image segmentation, localization, or such analysis of other types of data. Improvements to device operation due to the reduced processing resources is amplified in certain segmentation embodiments, where large numbers of analysis repetitions (e.g., for each pixel of an image or many different groupings of pixels) each involve a softmax operation. Even in larger processing environments with less resource constraints than a phone or other mobile or wearable device, the resource reductions from embodiments described herein and the associated improvement in device operation can be significant. Some such embodiments involve training the neural network using a plurality of training inputs and a plurality of associated target outputs and generating the normalized output from a first application input using the neural network, wherein the first application input comprises an image and wherein the normalized output represents a normalized probability associated with recognition of content of the image. Other embodiments can operate in any environment with neural network layers implemented in processing circuitry with memory, such as with neural network layers configured to be trained to set a plurality of weighting values for the plurality of neural network layers, with wherein the normalized output represents a normalized probability associated with recognition of audio content of audio data input to the plurality of neural network layers.

Figure 5:
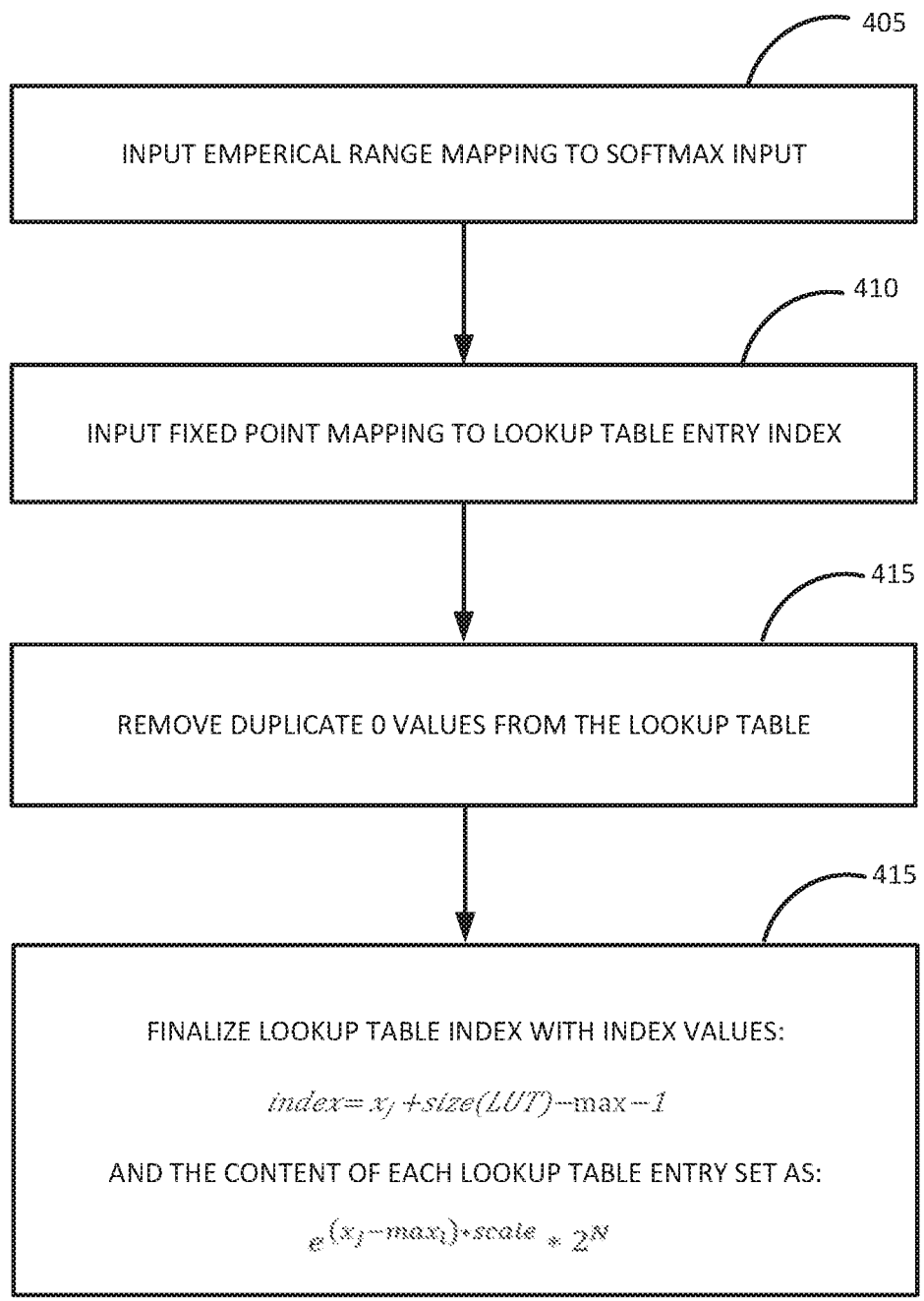
FIG. 5 is a flow chart illustrating a method of generating a single compact lookup table for a quantized softmax layer according to some example embodiments.
Figure 6:
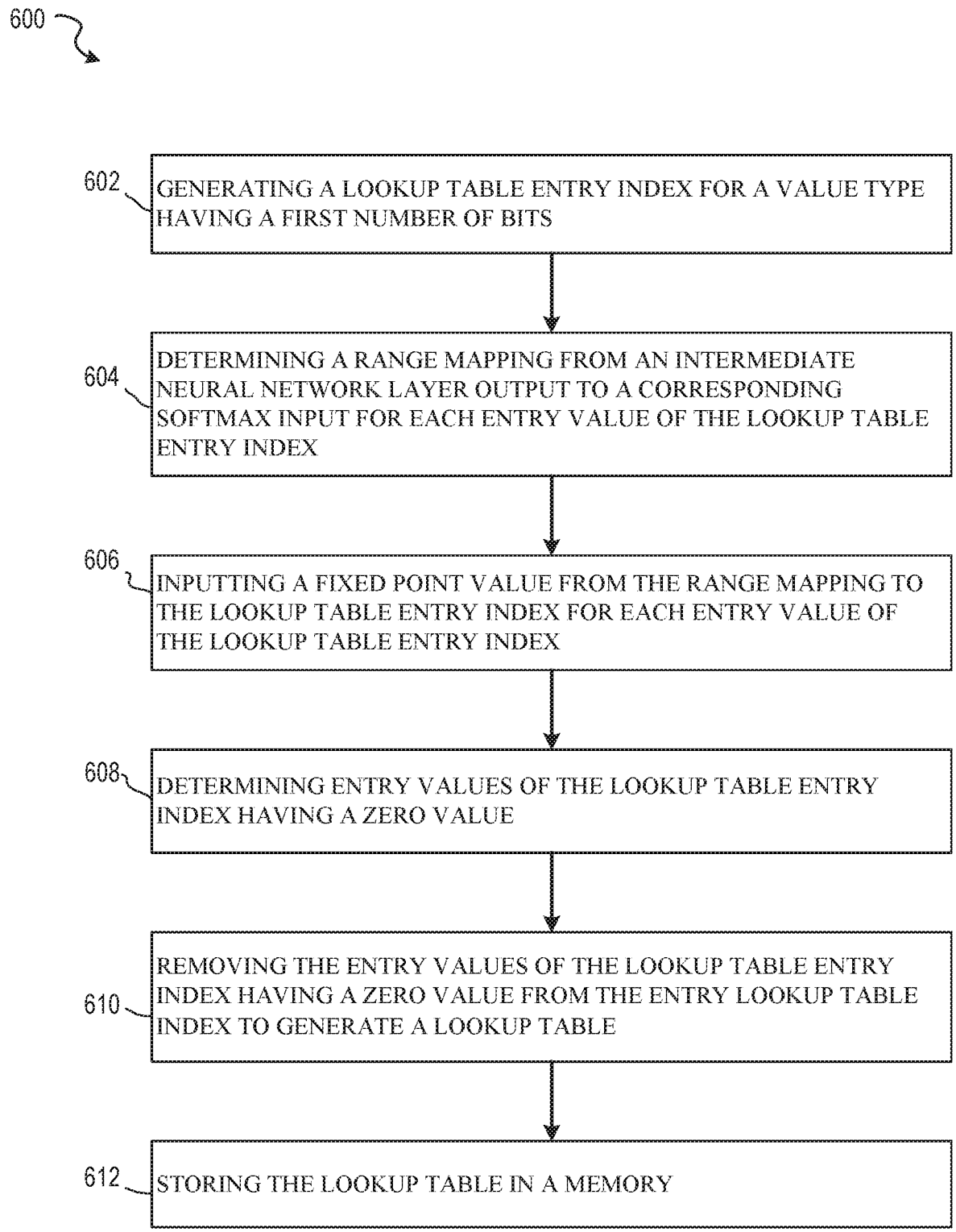
FIG. 6 is a flow chart illustrating a method of generating a single compact lookup table for a quantized softmax layer according to some example embodiments.

FIGS. 5 and 6 are flowcharts illustrating methods of generating a single compact lookup table for a quantized softmax layer in accordance with some embodiments. In FIG. 5, operation 505 involves inputting an empirical range mapping to softmax inputs. These fixed point mappings from operation 505 are then input to a lookup table entry index in operation 510. The lookup table entry index includes all inputs (e.g., including duplicate zero values). Then in operation 515, duplicate 0 values are removed from the lookup table, and the lookup table index with index values according to equation 3 above are finalized with the content of each lookup table entry set according to equation 4 above.

FIG. 6 is a flow chart illustrating a method 600 of generating a single compact lookup table for a quantized softmax layer according to some example embodiments in some embodiments, method 600 is embodied in a device with circuitry configured to perform the operations of method 600. In some embodiments, method 600 is implemented as instructions in a storage medium that, when executed by one or more processors, cause generation of a lookup table as described by method 600.

Method 600, for generating a lookup table for quantized softmax evaluation in a neural network, begins with operation 602 generating a lookup table entry index for a value type having a first number of bits. A range mapping from an intermediate neural network layer output to a corresponding softmax input for each entry value of the lookup table entry index is determined in operation 604, and operation 606 then involves inputting a fixed point value from the range mapping to the lookup table entry index for each entry value of the lookup table entry index. Entry values of the lookup table entry index having a zero value are determined in operation 608, and operation 610 then involves removing the entry values of the lookup table entry index having a zero value from the entry lookup table index to generate a lookup table, and storing the lookup table in a memory. This lookup table as generated in operation 610 is then stored in a memory in operation 612.

As described above, this creates a compact table where indexes determined by a distance from the input value to the maximum input value are used in the softmax layer. In some embodiments, the index value for each entry of the lookup table is determined according to equation 3 above. The range mapping to the softmax input comprises quantizing a set of floating point values to the set of fixed point values using:

$$\text{Floating} - f_{max} \quad (5)$$

where $f_{max}$ is a layer input empirical range; and Floating is the set of floating point values from the intermediate neural network layer(s). In various embodiments, a quantization system or layer can be used to quantize floating point values to fixed point values, and can dynamically adjust (e.g., by increasing or decreasing) the quantization level. Such a quantization system may adjust the quantization level based on one or more design constraints (e.g., hardware cost, performance, and accuracy).

It will be understood that while particular operations are described in a particular order above, various other embodiments can involve intervening and/or repeated operations, and that additional embodiments not specifically described are possible within the scope of the described innovations.

Figure 7:
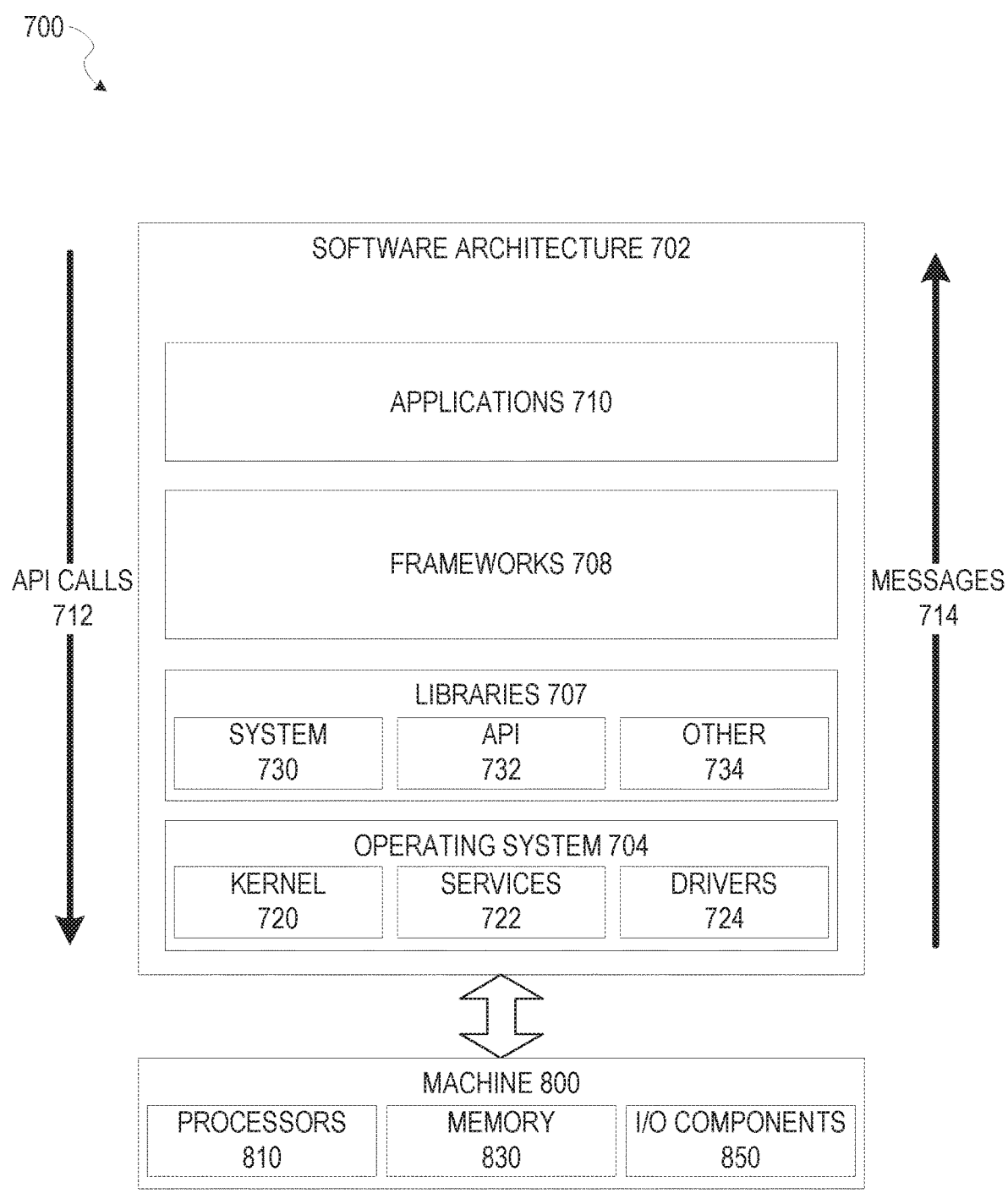
FIG. 7 is a block diagram illustrating an example of a software architecture that may be operating on an electronic design automation (EDA) computer and used with quantized softmax layers as described herein in accordance with some example embodiments.

FIG. 7 is a block diagram 700 illustrating an example of a software architecture 702 that may be operating on any machine described herein and associated with generating tables for or using a softmax layer of a neural network or a circuit for implementing a neural network with a quantized softmax layer as described herein.

FIG. 7 is merely a non-limiting example of a software architecture 702, and it will be appreciated that many other architectures can be implemented to facilitate the functionality described herein. In various embodiments, the software architecture 702 is implemented by hardware such as a machine 800 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 707, software frameworks 708, and applications 710. Operationally, the applications 710 invoke application programming interface (API) calls 712 through the software stack and receive messages 714 in response to the API calls 712, consistent with some embodiments. In various embodiments, any client device, server computer of a server system, or any other device described herein may operate using elements of the software architecture 702. A computing device described herein may additionally be implemented using aspects of the software architecture 702, with the software architecture 702 adapted for generation and use of tables or softmax layers in accordance with embodiments described herein.

In one embodiment, an application of the applications 710 performs operations described herein for generating a lookup table as described herein. In other embodiments, the application may be any application that uses a neural network with a softmax layer as described herein. In various other embodiments, rather than being implemented as neural networking modules of one or more applications 710, some or all of the modules used for such neural networks can be implemented using elements of the libraries 707 or operating system 704.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, signal processing drivers to optimize modelling computation, memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730, such as libraries of multi-instance blocks for use in an EDA environment or other libraries that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic context on a display), database libraries (e.g., SQLite to provide various relational database functions), web libraries (e.g., WebKit to provide web browsing functionality), and the like. The libraries 706 may also include other libraries 734.

The software frameworks 708 provide a high-level common infrastructure that can be utilized by the applications 710, according to some embodiments. For example, the software frameworks 708 provide various graphic user interface (GUI) functions, high-level resource management, high-level location services, and so forth. The software frameworks 708 can provide a broad spectrum of other APIs that can be utilized by the applications 710, some of which may be specific to a particular operating system 704 or platform. In various embodiments, the systems, methods, devices, and instructions described herein may use various files, macros, libraries, and other elements of an EDA or neural network environment to implement operations or various embodiments described herein. This includes analysis of input design files for an integrated circuit design, IP blocks and associated test patterns, functional information for implementing pattern migration from IP blocks to a system on a chip (SOC) or application-specific integrated circuit (ASIC) design boundary, or any other such information that may be used as part of or along with the embodiments described herein. While netlist files, library files, SDC files, and view definition files are examples that may operate within the software architecture 702, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA), an SOC, or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instant of time and to constitute a different a ware module at a different instant of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 800, but deployed across a number of machines 800. In some example embodiments, the processors 810 or processor-implemented modules are located in a single geographic location (e.g., within a home environment, an office environment, or a server farm). In other example embodiments, the processors 810 or processor-implemented modules are distributed across a number of geographic locations.

Figure 8:
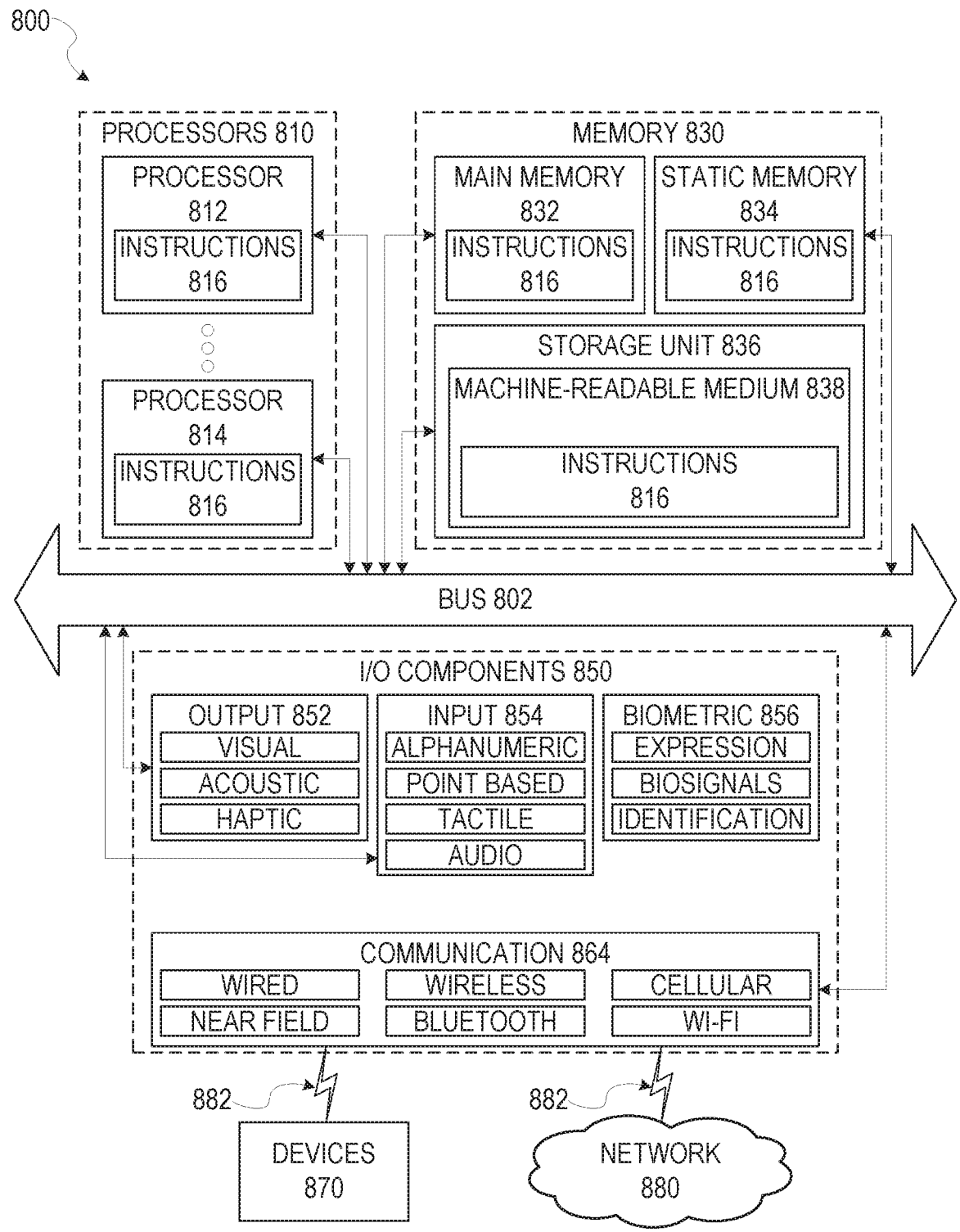
FIG. 8 is a block diagram illustrating an example machine that may implement various embodiments described herein.

FIG. 8 is a diagrammatic representation of the machine 800 in the form of a computer system within which a set of instructions may be executed for causing the machine 800 to perform any one or more of the methodologies discussed herein, according to an example embodiment. FIG. 8 shows components of the machine 800, which is, according to some embodiments, able to read instructions from a machine-readable medium (e.g., a machine-readable storage medium) and perform any one or more of the methodologies discussed herein. In some embodiments, the machine 800 may operate with instructions 816 (e.g., software, a program, an application, an applet, an app, or other executable code) for causing the machine 800 to perform any one or more of the methodologies discussed. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute the instructions 816 contemporaneously. Although FIG. 8 shows multiple processors 810, the machine 800 may include a single processor 812 with a single core, a single processor 812 with multiple cores (e.g., a multi-core processor 812), multiple processors 810 with a single core, multiple processors 810 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions 816, when executed by one or more processors of the machine 800 (e.g., the processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point based input components a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a process 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein. Embodiments described herein then optimize and improve the operation of a device such as the machine 800 in implementing EDA operations by improving resource usage of the machine 800 or another associated machine as part of design, fabrication, and testing of a circuit device.

Communication can be implemented using a wide variety of technologies. The I/O components 850 may include communication components 864 operable to couple the machine 800 to a network 880 or devices 870 via couplings 882. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine or any of a wide variety of peripheral devices a peripheral device coupled via a USB).

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
receiving, at an input to a softmax layer of a neural network from an intermediate layer of the neural network, a non-normalized output comprising a plurality of intermediate network decision values;
for each intermediate network decision value of the plurality of intermediate network decision values:
calculating, by one or more processors, a difference between the intermediate network decision value and a maximum network decision value;
requesting, from a lookup table by the one or more processors, a corresponding lookup table value using the difference between the intermediate network decision value and the maximum network decision value, wherein an index value for each entry value of the lookup table is determined according to index=$x_j$+size(LUT)−max−1, wherein index is the index value, wherein $x_j$ is a value of a fixed point value for a corresponding index value, wherein size (LUT) is a number of entry values in the lookup table following removal of entry values having a zero value, and wherein max is a maximum value of all index values of the lookup table; and
selecting, by the one or more processors, the corresponding lookup table value as a corresponding decision value; and
generating, by the one or more processors, a normalized output comprising the corresponding lookup table value for the each intermediate network decision value of the plurality of intermediate network decision values.

2. The method of claim 1, wherein the plurality of intermediate network decision values comprises a plurality of signed sixteen bit values.

3. The method of claim 2, wherein the lookup table comprises less than 63000 entry values.

4. The method of claim 2, wherein the normalized output comprises a plurality of unsigned sixteen bit values.

5. The method of claim 4, wherein the corresponding lookup table value for the each intermediate network decision value comprises an unsigned fifteen bit value.

6. The method of claim 1, wherein the plurality of intermediate network decision values comprises a plurality of signed eight bit values.

7. The method of claim 2, wherein the normalized output comprises a plurality of unsigned eight bit values.

8. The method of claim 1, further comprising:
prior to receiving the non-normalized output, generating a lookup table entry index for a first application and a value type having a first number of bits associated with the plurality of intermediate network decision values for the first application;
for each entry value of the lookup table entry index:
determining a range mapping from the each intermediate network decision value of the plurality of intermediate network decision values to a corresponding softmax input; and
inputting the respective fixed point value from the range mapping to the lookup table entry index;
determining duplicate entry values of the lookup table entry index having the zero value; and
removing the duplicate entry values of the lookup table entry index having the zero value from the entry lookup table index to generate the lookup table.

9. The method of claim 8, wherein an output value type for the lookup table is dynamically selected based on the number of entry values of the lookup table having a non-zero value.

10. The method of claim 8, wherein the lookup table has a single zero entry value.

11. The method of claim 1, further comprising:
converting a plurality of floating point intermediate network decision values from a non-normalized floating point output of a final add-accumulate layer of the neural network, the non-normalized output comprising the plurality of intermediate network decision values, wherein the plurality of intermediate network decision values comprises fixed point values.

12. The method of claim 1, further comprising:
training the neural network using a plurality of training inputs and a plurality of associated target outputs; and
generating the normalized output from a first application input using the neural network, wherein the first application input comprises an image and wherein the normalized output represents a normalized probability associated with recognition of content of the image.

13. An integrated circuit comprising:
memory;
processing circuitry configured into a plurality of neural network layers; and
softmax circuitry coupled to the processing circuitry and configured to:
receive, at an input to a softmax circuitry from an output layer of the plurality of neural network layers, a non-normalized output comprising a plurality of intermediate network decision values;
for each intermediate network decision value of the plurality of intermediate network decision values:
calculate a difference between the intermediate network decision value and a maximum network decision value;
request, from a lookup table in the memory, a corresponding lookup table value using the difference between the intermediate network decision value and the maximum network decision value, wherein an index value for each entry value of the lookup table is determined according to index=$x_j$+size(LUT)−max−1, wherein index is the index value, wherein $x_j$ is a value of a fixed point value for a corresponding index value, wherein size (LUT) is a number of entry values in the lookup table following removal of entry values having a zero value, and wherein max is a maximum value of all index values of the lookup table; and
select the corresponding lookup table value as a corresponding decision value; and
generate a normalized output comprising the corresponding lookup table value for the each intermediate network decision value of the plurality of intermediate network decision values.

14. The integrated circuit of claim 13, wherein the processing circuitry for the plurality of neural network layers is configured to be trained to set a plurality of weighting values for the plurality of neural network layers, and wherein the normalized output represents a normalized probability associated with recognition of audio content of audio data input to the plurality of neural network layers.

15. A method of generating a lookup table for quantized softmax evaluation in a neural network, the method comprising:
generating a lookup table entry index for a data type having a first number of bits;
for each entry value of the lookup table entry index:
determining a range mapping from an intermediate neural network layer output to a corresponding softmax input; and
inputting a fixed point value from the range mapping to the lookup table entry index;
determining entry values of the lookup table entry index having a zero value;
removing the entry values of the lookup table entry index having the zero value from the lookup table entry index to generate the lookup table, wherein an index value for each entry value of the lookup table is determined according to index=$x_j$+size(LUT)−max−1, wherein index is the index value, wherein $x_j$ is a value of the fixed point value for a corresponding index value, wherein size (LUT) is a number of entry values in the lookup table following removal of the entry values having the zero value, and wherein max is a maximum value of all index values of the lookup table; and
storing the lookup table in a memory.

16. The method of claim 15, wherein the determining of the range mapping from the intermediate neural network layer output to the corresponding softmax input comprises quantizing a set of floating point values to a set of fixed point values using:
Floating—$f_{max}$ where $f_{max}$ is a layer input empirical range; and
Floating is the set of floating point values.

17. The method of claim 16, wherein the lookup table entry index comprises $2^N$−1 entry values, wherein N is the first number of bits.

18. The method of claim 17, wherein each non-zero entry of the lookup table is determined according to $e^{(x_j - max_l)*scale}*(2^N)$ where scale is a scaling factor for an application.

19. The method of claim 18, wherein the first number of bits is 16, and wherein the number of entry values for the lookup table is less than 30000.

20. The method of claim 8, wherein the determining of the range mapping from the each intermediate network decision value of the plurality of intermediate network decision values to the corresponding softmax input comprises quantizing a set of floating point values to a set of fixed point values using:

Floating—$f_{max}$ where $f_{max}$ is a layer input empirical range; and

Floating is the set of floating point values.

\* \* \* \* \*